United States Patent
Bargent et al.

(10) Patent No.: US 12,539,779 B2
(45) Date of Patent: Feb. 3, 2026

(54) SYSTEMS AND METHODS FOR CHARGING ELECTRICAL ENERGY STORAGE SYSTEMS

(71) Applicant: Cummins Inc., Columbus, IN (US)

(72) Inventors: Mark Andrew Bargent, Kent (GB); Apoorv Prakash Hiremath, Kent (GB); Ankit Vinodchandra Patel, Kent (GB)

(73) Assignee: Cummins Inc., Columbus, IN (US)

( * ) Notice: Subject to any disclaimer, the term of this patent is extended or adjusted under 35 U.S.C. 154(b) by 693 days.

(21) Appl. No.: 17/911,933

(22) PCT Filed: Mar. 25, 2021

(86) PCT No.: PCT/US2021/024115
§ 371 (c)(1),
(2) Date: Sep. 15, 2022

(87) PCT Pub. No.: WO2021/195355
PCT Pub. Date: Sep. 30, 2021

(65) Prior Publication Data
US 2023/0133822 A1    May 4, 2023

Related U.S. Application Data

(60) Provisional application No. 63/000,720, filed on Mar. 27, 2020.

(51) Int. Cl.
*H02J 7/00* (2006.01)
*B60L 53/10* (2019.01)
(Continued)

(52) U.S. Cl.
CPC .............. *B60L 53/14* (2019.02); *B60L 53/11* (2019.02); *B60L 53/53* (2019.02); *H02J 7/0031* (2013.01); *B60L 2210/30* (2013.01)

(58) Field of Classification Search
USPC ........................................................ 320/109
See application file for complete search history.

(56) References Cited

U.S. PATENT DOCUMENTS

| 5,803,215 A | 9/1998 | Henze et al. |
| 10,040,363 B2 | 8/2018 | Beaston et al. |

(Continued)

FOREIGN PATENT DOCUMENTS

WO    2018126393 A1    7/2018

OTHER PUBLICATIONS

International Search Report and Written Opinion for International patent application No. PCT/US2021/024115, filed Mar. 25, 2021, mailed Jun. 25, 2021.

(Continued)

*Primary Examiner* — Samuel Berhanu
(74) *Attorney, Agent, or Firm* — Faegre Drinker Biddle & Reath LLP (57) ABSTRACT

Energy storage systems for charging an electronic device and methods of operating the same are disclosed. The energy storage system includes an AC bus, a DC bus, a plurality of batteries, a plurality of breakers, a plurality of inverters, and a controller operatively coupled with the batteries and the breakers. The method includes calculating, by the controller, an amount of power necessary to charge the electronic device; operating, by the controller, the breakers such that the batteries of a discharging station is configured to discharge through a charging station; and charging the electronic device using the batteries.

20 Claims, 10 Drawing Sheets

(51) Int. Cl.
*B60L 53/14* (2019.01)
*B60L 53/53* (2019.01)

(56) References Cited

U.S. PATENT DOCUMENTS

| | | | |
|---|---|---|---|
| 2004/0130292 A1* | 7/2004 | Buchanan | B60L 53/20 |
| | | | 320/116 |
| 2010/0181837 A1 | 7/2010 | Seeker | |
| 2012/0068540 A1 | 3/2012 | Luo | |
| 2012/0326668 A1 | 12/2012 | Ballatine | |
| 2013/0069592 A1 | 3/2013 | Bouman | |
| 2013/0099581 A1 | 4/2013 | Zhou | |
| 2013/0229057 A1* | 9/2013 | Taima | H02J 7/0068 |
| | | | 307/19 |
| 2015/0326040 A1 | 11/2015 | Kawai et al. | |
| 2016/0068073 A1 | 3/2016 | Taylor et al. | |
| 2018/0019683 A1* | 1/2018 | Wagoner | H02J 13/00006 |
| 2018/0170201 A1 | 6/2018 | Miller et al. | |
| 2018/0358839 A1* | 12/2018 | Perez | H02J 3/46 |
| 2019/0260206 A1 | 8/2019 | Gudgel et al. | |

OTHER PUBLICATIONS

European Search Report for EP Patent Application No. 21775146.0, Issued on Jun. 7, 2024, 07 pages.

* cited by examiner

SYSTEMS AND METHODS FOR CHARGING ELECTRICAL ENERGY STORAGE SYSTEMS

CROSS-REFERENCE TO RELATED APPLICATIONS

This application claims priority to International Patent Application No. PCT/US2021/024115, filed Mar. 25, 2021, which claims priority to U.S. Provisional Application No. 63/000,720, filed on Mar. 27, 2020, the contents of which are incorporated herein by reference in their entirety.

FIELD OF THE DISCLOSURE

The present disclosure relates generally to electrical and hybrid vehicles, especially to systems for charging the electrical energy storage of such vehicles.

BACKGROUND OF THE DISCLOSURE

In the field of electric vehicles (EVs), hybrid electric vehicles (HEVs) and plug-in hybrid electric vehicles (PHEVs), typical chargers charge the batteries of the vehicles from a utility power grid. This method of charging such vehicles may be non-economical and create higher dependency on the utility power grid. In some cases, an energy storage system is used to store the energy when it is more economical to do so, and then the energy is discharged to the vehicles at an agreed time and for desired duration. A typical power grid supplies energy via an alternating current (AC) power line. Therefore, an inverter which converts AC power to direct current (DC) power to charge the energy storage system is also required. Additionally, in some examples, the energy storage system also uses DC-to-DC converters to convert the DC current from one voltage level to another voltage level to accommodate different power applications. The implementation of such inverters and converters may increase the manufacturing cost as well as the size of the energy storage system. As such, there is a need for energy storage systems that do not require such inverters or converters.

SUMMARY

Various embodiments of the present disclosure relate to method for charging an electronic device using an energy storage system comprising an AC bus, a DC bus, a plurality of batteries, a plurality of breakers, a plurality of inverters, and a controller operatively coupled with the batteries and the breakers. The method includes the controller calculating an amount of power necessary to charge the electronic device, the controller operating the breakers such that the batteries of a discharging station are configured to discharge through a charging station, and the batteries charging the electronic device.

In some examples, the discharging station and the charging station each includes one or more racks, each rack including a battery, an inverter, a first inverter coupling the battery with the inverter, and a second inverter coupling the inverter with the DC bus. In some examples, the method further includes operating at least one of the breakers to be in an open position and reducing a number of the batteries to be discharged in the discharging station.

In some examples, operating the breakers include operating a first set of breakers to electrically couple the batteries of the discharging station with the AC bus, and operating a second set of breakers to electrically couple inverters of the charging station with the DC bus. Furthermore, operating the breakers may include operating a third set of breakers to electrically disconnect the batteries of the discharging station from the DC bus, and operating a fourth set of breakers to electrically disconnect batteries of the charging station from the AC bus. In some examples, the electronic device is an electric vehicle.

Various embodiments of the present disclosure relate to energy storage systems for charging an electronic device. The energy storage system includes an AC bus, a DC bus, a plurality of batteries, a plurality of breakers, a plurality of inverters, and a controller operatively coupled with the batteries and the breakers. The controller is configured to calculate an amount of power necessary to charge the electronic device, operate the breakers such that the batteries of a discharging station are configured to discharge through a charging station, and charge the electronic device using the batteries.

In some examples, the discharging station and the charging station each includes one or more racks. Each rack includes: a battery, an inverter, a first inverter coupling the battery with the inverter, and a second inverter coupling the inverter with the DC bus. In some examples, the controller is further configured to operate at least one of the breakers to be in an open position and reduce a number of the batteries to be discharged in the discharging station.

In some examples, the breakers include a first set of breakers configured to electrically couple the batteries of the discharging station with the AC bus, and a second set of breakers configured to electrically couple inverters of the charging station with the DC bus. The controller is configured to operate the first and second sets of breakers to be in a closed-circuit configuration when the electronic device is being charged. Furthermore, the breakers may also include a third set of breakers configured to electrically couple the batteries of the discharging station from the DC bus, and a fourth set of breakers configured to electrically couple batteries of the charging station from the AC bus. The controller is configured to operate the third and fourth sets of breakers to be in an open-circuit configuration when the electronic device is being charged.

Various embodiments of the present disclosure relate to controllers of an energy storage system for charging an electronic device. The controller is operatively coupled with a plurality of batteries, a plurality of breakers, and a plurality of inverters. The controller is configured to calculate an amount of power necessary to charge the electronic device, operate the breakers such that the batteries of a discharging station are configured to discharge through a charging station, and charge the electronic device using the batteries.

In some examples, the discharging station and the charging station each includes one or more racks, and each rack includes: a battery, an inverter, a first inverter coupling the battery with the inverter, and a second inverter coupling the inverter with the DC bus. In some examples, the controller is configured to operate at least one of the breakers to be in an open position and reduce a number of the batteries to be discharged in the discharging station.

In some examples, the breakers include a first set of breakers configured to electrically couple the batteries of the discharging station with an AC bus and a second set of breakers configured to electrically couple inverters of the charging station with a DC bus, such that the controller is configured to operate the first and second sets of breakers to be in a closed-circuit configuration when the electronic device is being charged. Furthermore, the breakers may further include a third set of breakers configured to electrically couple the batteries of the discharging station from the DC bus and a fourth set of breakers configured to electrically couple batteries of the charging station from the AC bus such that the controller is configured to operate the third and fourth sets of breakers to be in an open-circuit configuration when the electronic device is being charged.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner. While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1:
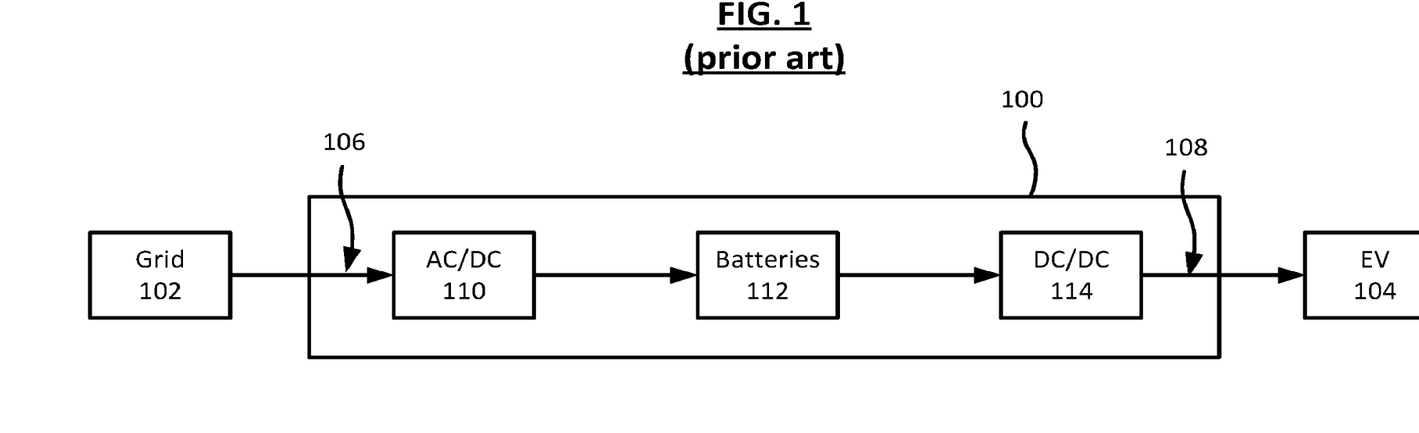
FIG. 1 is a schematic diagram of an energy storage system as known in the art.

FIG. 1 shows an example of an energy storage system (ESS) 100 as known in the art. The power is provided by a utility power grid 102 to the ESS 100, after which an electric vehicle (EV) 104 is charged using the power stored in the ESS 100. The ESS 100 has a common AC bus 106 on one end coupled to the grid 102 and a common DC bus 108 coupled to a DC/DC converter 114 on the other end. The AC bus 106 is coupled to a plurality of AC/DC inverters 110 to convert the current from AC to DC, and the DC bus 108 is coupled to the batteries 112 that receive the DC power from the AC/DC inverters 110 and supply the DC power through DC/DC converter 114 and then to the EV 104 to adjust the voltage level of the supplied power from the batteries 112 for the EV 104 to use, in order to accommodate for a number of different voltage levels which may be required.

Figure 2:
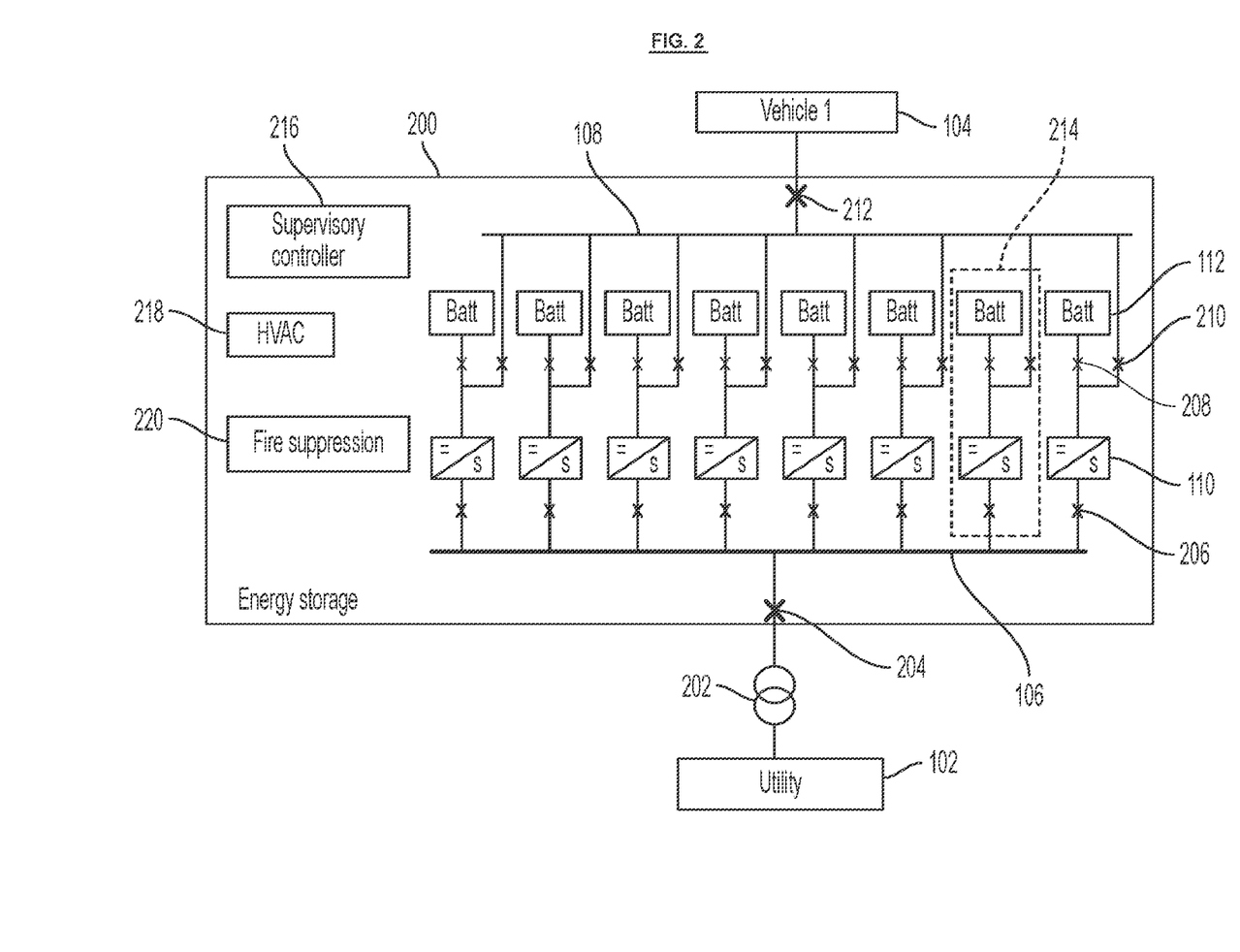
FIG. 2 is a schematic diagram of an example of an energy storage system according to some embodiments.

FIG. 2 shows an example of an ESS 200 as presently disclosed according to some embodiments. The ESS 200 has a transformer 202 located between the utility power grid 102 and the ESS 200. The ESS 200 further includes a utility breaker 204 located between the transformer 202 and an AC breaker 206 connected to the AC/DC inverters 110. Each of the inverters 110 is connected to two DC breakers: one breaker 208 connected to the battery 112 and another breaker 210 connected to a DC bus 108. A DC load breaker 212 is located between the DC bus 108 and the EV 104. The set of breakers 206, 208, 210, inverter 110, and battery 112 are defined as a rack 214, and each rack 214 is controlled independently using a supervisory controller 216. Also, each of the connections referred to herein is an electrical connection, which may be implemented using wires, for example, or any other suitable means of electrical conduction. Furthermore, each of the aforementioned breakers is a circuit breaker which can be in an off position for an open circuit or an on position for a closed circuit.

The ESS 200 includes the supervisory controller 216 to control each of the breakers as previously mentioned using an internal algorithm, thus grouping one or more racks 214 together for charging and discharging the batteries 112 and the EV 114, as further explained herein. The ESS 200 also includes heating, ventilation, and air conditioning (HVAC) 218 as well as fire suppression feature 220 to prevent the batteries 112 from overheating and setting the system on fire. For simplicity, the controller 216, HVAC 218, and fire suppression feature 220 are omitted from the other figures hereinafter, although it is to be implied that any ESS may be implemented with such components as suitable and as known in the art. The controller 216 is able to provide instruction signals to each of the components such that the changes in the components are implemented synchronously. In some examples, the controller 216 is a processor such as a central processing unit (CPU). The controller 216 may also be a state machine built using a programmable logic device, a programmable logic controller, logic gates and flip flops, or relays.

Figure 3:
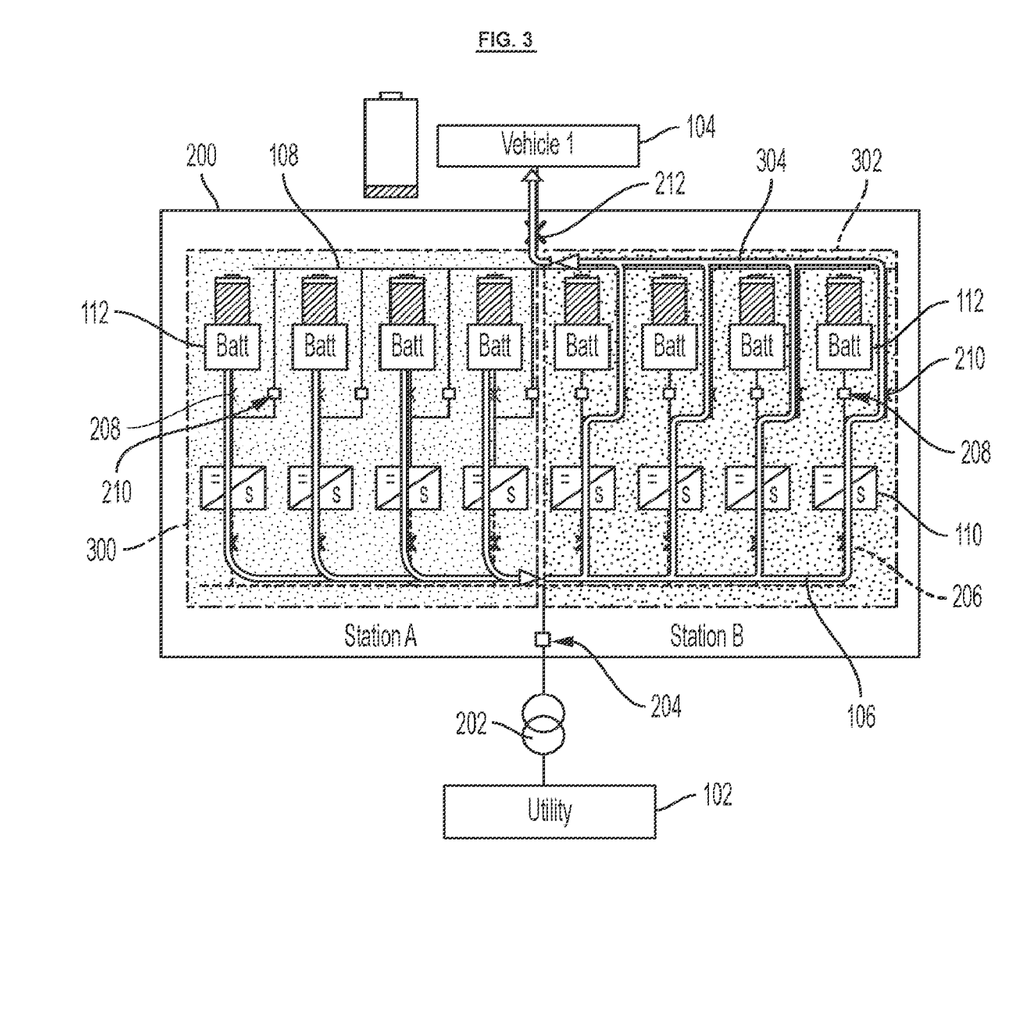
FIG. 3 shows the energy storage system of FIG. 2 in one configuration to charge an electric vehicle according to some embodiments.

FIG. 3 shows an example of how the ESS 200 operates according to some embodiments, when the EV 104 has a low state of charge (SOC) and the batteries 112 of the ESS 200 are sufficiently charged to provide power to the EV 104. When the EV 104 needs power, a processing device within the EV 104 communicates with the controller 216 and sends a request for charging the EV 104, in response to which the controller 216 may acknowledge or deny the request from the EV 104. If the SOC of the batteries 112 in the ESS 200 is sufficiently high and the controller 216 acknowledges the request, the utility power grid 102 is disconnected from the ESS 200 by opening the utility breaker 204, and instead the DC load breaker 212 is closed to connect the ESS 200 with the EV 104. The controller 216 then groups the racks 214 into one of two groups: Station A 300 or Station B 302. In this case, Station A 300 is the discharging station and Station B 302 is the charging station.

As disclosed herein, a "discharging" station can be defined as a station which includes a battery that discharges to provide power, whereas a battery of a "charging station" does not discharge. In some examples, the battery of the charging station may be connected to the power grid to charge, or the battery may be disconnected such that the station is used as a pathway for the electrical flow to pass through between the discharging battery and the charging vehicle. Some embodiments include equal numbers of charging stations as discharging stations.

Figure 4:
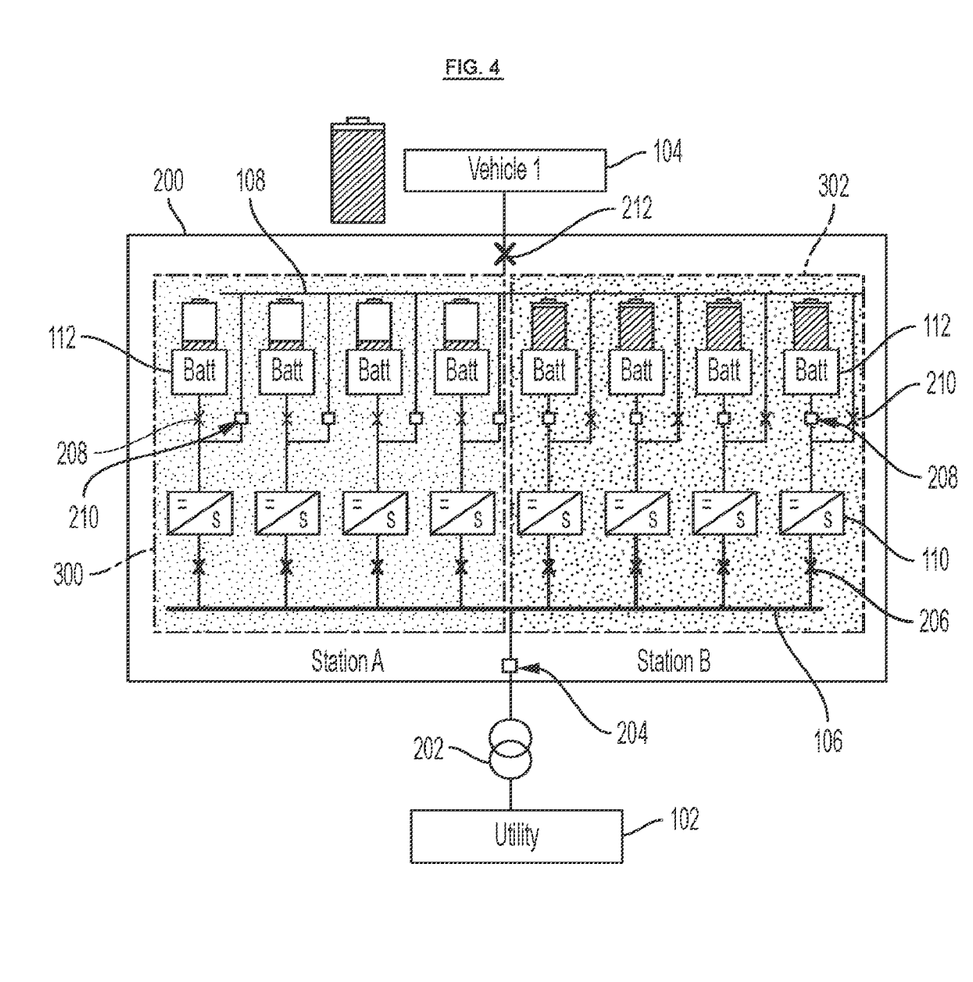
FIG. 4 shows the energy storage system of FIG. 3 when the electric vehicle is fully charged according to some embodiments.

Upon determining by the controller 216 that the batteries 112 in Station A have sufficiently high SOC, the controller 216 closes the DC breakers 208 and opens the DC breakers 210 in Station A 300. This may be achieved by pre-charging the DC breaker 208 in Station A 300 to close and form a grid on the AC side using the inverters 110, after which the rest of the inverters 110 are to synchronize and connect to the AC bus 106. Also, in Station B 302, the DC breakers 208 are open and the DC breakers 210 are closed. As such, the controller 216 creates an electrical path 304 from the batteries 112 in Station A 300 through the inverters 110 of Station A 300, followed by the AC bus 106, the inverters 110 of Station B 302, the DC bus 108, and the EV 104. Electrical flow 304 is illustrated to show each of the components that electricity passes through in this case. FIG. 4 shows the SOC for each of the batteries 112 and the battery of the EV 104 after the batteries in the EV 104 reach a desired SOC level.

Specifically, in some examples, the controller 216 operates by first analyzing the SOC of the EV 104 and calculates the amount of power (in kW) necessary for the EV 104. The controller 216 then calculates if the ESS 200 is capable of supplying the power based on analyzing the SOC of the batteries 112 in the ESS 200. Afterwards, the controller 216 operates each of the breakers as explained above to initiate power flow from the batteries 112 in the discharging station (Station A 300 in FIG. 3) to the EV 104. After the desired SOC of the EV 104 is achieved, the controller 216 acknowledges the request to disconnect the EV 104 from the ESS 200 and opens the DC load breaker 212 and the DC breakers 210 of the charging station (Station B 302 in FIG. 4).

As shown, the electrical power is supplied as DC power from the batteries 112 in Station A 300 but is converted to AC power after passing through the inverters 110 in Station A 300. Then, the same AC power is converted into DC power after passing through the inverters 110 in Station B 300 before being supplied to the batteries of the EV 104. Thus, this process reduces the need for the converter 114 as shown in FIG. 1 because the amount of power provided by the batteries may be adjusted by adjusting which of the breakers to open or close. For example, if a lower voltage level is required, one or more of the AC breakers 206 may be opened in Station A 300 such that a fewer number of batteries 112 in Station A 300 is discharging.

Figure 5:
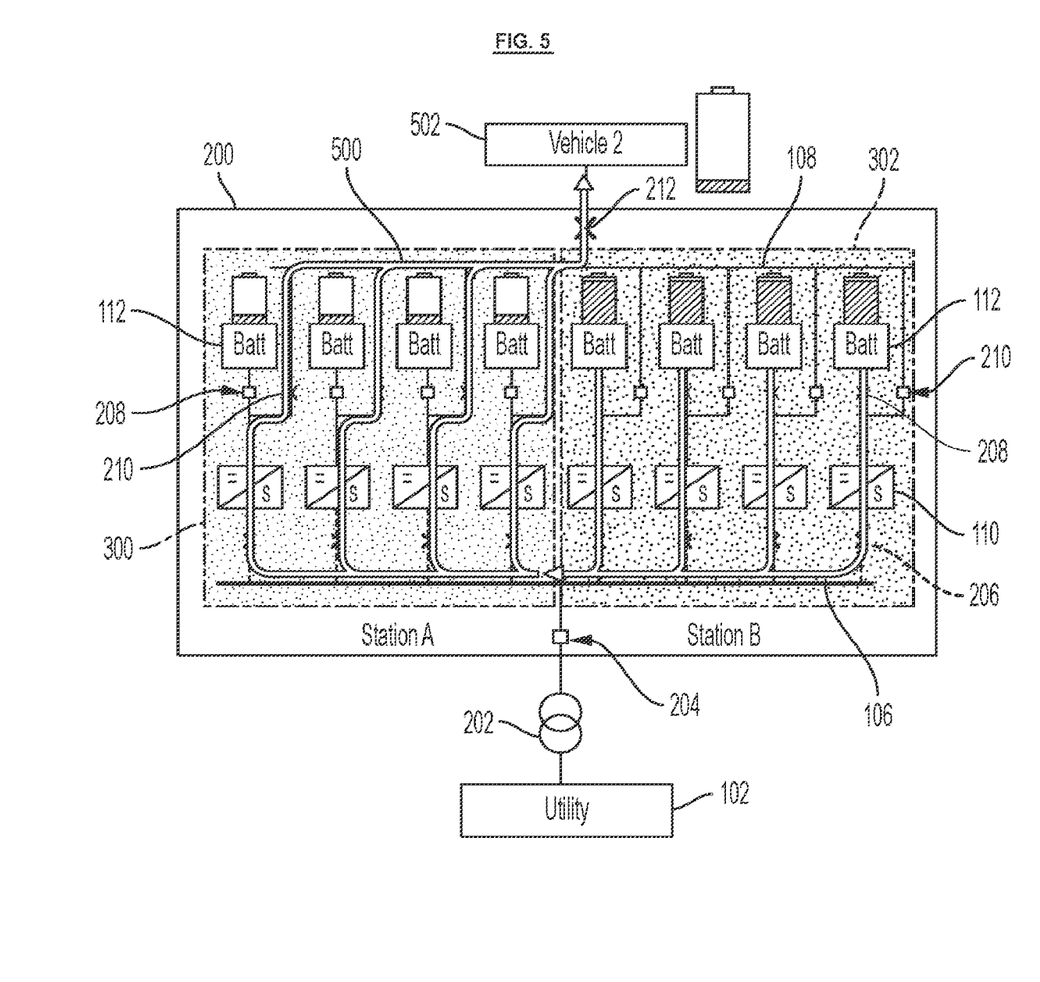
FIG. 5 shows the energy storage system of FIG. 4 when another electric vehicle is being charged according to some embodiments.

FIG. 5 shows an example of how the ESS 200 operates according to some embodiments, when another EV 502 having low SOC requests charging from the ESS 200 after the EV 104 is fully charged, further to FIG. 4. Because the batteries 112 in Station A 300 have low SOC after charging the previous EV 104, the batteries 112 in Station B 302 are now used for charging the EV 502. As such, in this case, Station B 302 is the discharging station and Station A 300 is the charging station. The breakers 210 of the discharging station (Station B 302) are opened, the breakers 208 of the discharging station are closed, the breakers 210 of the charging station (Station A 300) are closed, and the breakers 208 of the charging station are opened. Electrical flow 500 is illustrated to show each of the components that electricity passes through in this case. In effect, the controller 216 swaps the function of the stations so the same process described with reference to FIG. 3 can be repeated using the other station. When the EV 502 reaches a desired SOC level, the charging may be terminated by opening the DC load breaker 212 as well as all the DC breakers 210 of the charging station (Station A 300). The controller 216 may subsequently close the utility breaker 204 to connect the ESS 200 with utility power grid 102 in order to charge the batteries 112 in both Stations A 300 and B 302. The charging may be performed at an assigned time, for example during the night. It is understood that users can choose to charge the EVs 104 and 502 directly from the utility power grid 102 if there is a demand to charge when the ESS 200 is fully discharged or if it is more economical to charge from the utility.

Figure 6:
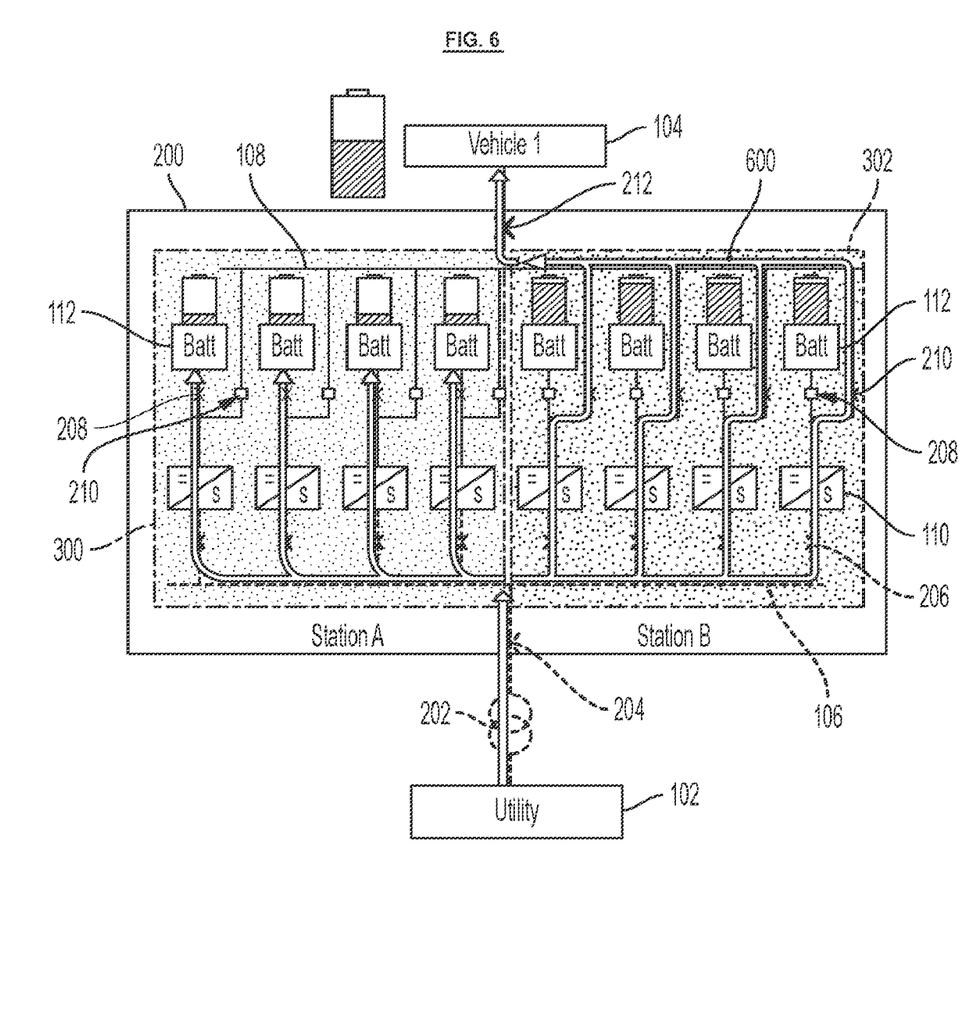
FIG. 6 shows the energy storage system of FIG. 4 when batteries of the energy storage system is being charged simultaneously as the electric vehicle according to some embodiments.

FIG. 6 shows an example of how the ESS 200 operates according to some embodiments, when the EV 104 and the ESS 200 are simultaneously charged using the utility power grid 102. The controller closes the utility breaker 204 such that power can be provided to the AC bus 106. The batteries 112 of Station A 300 are shown to have lower SOC than the batteries 112 of Station B 302. As such, the charging of the batteries 112 in Station A 300 is prioritized over the batteries 112 in Station B 302, and thus, the controller 216 closes the breakers 208 in Station A 300 that lead to the batteries 112 and opens the breakers 210 in Station A 300 that lead to the DC bus 108. The controller 216 also opens the breakers 208 in Station B 302 and closes the breakers 210 in Station B 302 to form an electrical flow 600 extending from the utility power grid 102 to the batteries 112 of Station A 300 and the EV 104 through Station B 302, allowing both the batteries of Station A 300 and the EV 104 to charge simultaneously.

Figure 7:
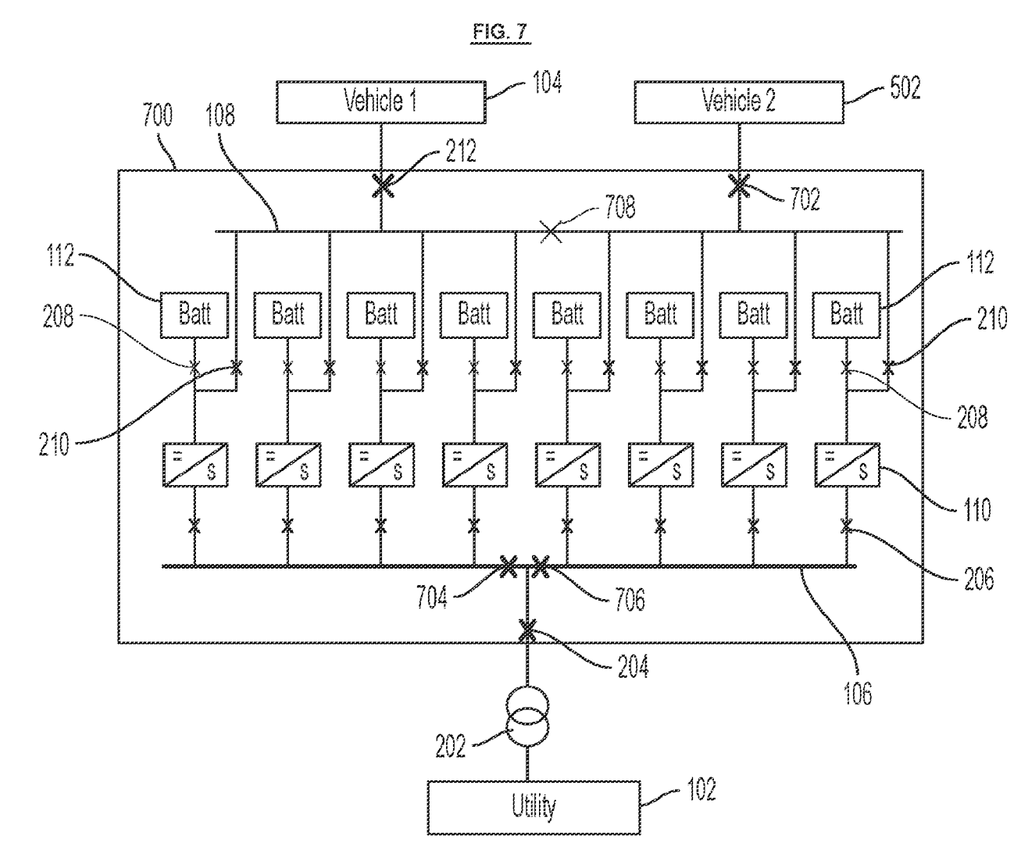
FIG. 7 is a schematic diagram of an example of an energy storage system capable of charging multiple electric vehicles simultaneously according to some embodiments.

FIG. 7 shows an example of an ESS 700 according to some embodiments, when two EVs, the EV 104 and the EV 502, can be simultaneously connected to the ESS 700. It should be understood that although only two EVs are shown, the ESS 700 can be designed such that three or more EVs may be connected to the ESS 700 at any one time. The ESS 700 has an additional DC load breaker 702 that connects the EV 502 with the DC bus 108. The ESS 700 also has a pair of AC tie breakers 704 and 706 located on the AC bus 106, where each of the tie breakers 704 and 706 controls the connection of some of the components in ESS 700 with the rest of the components, i.e. breaks the electrical "tie" between two components. Similarly, a DC tie breaker 708 is located on the DC bus 108.

Figure 8:
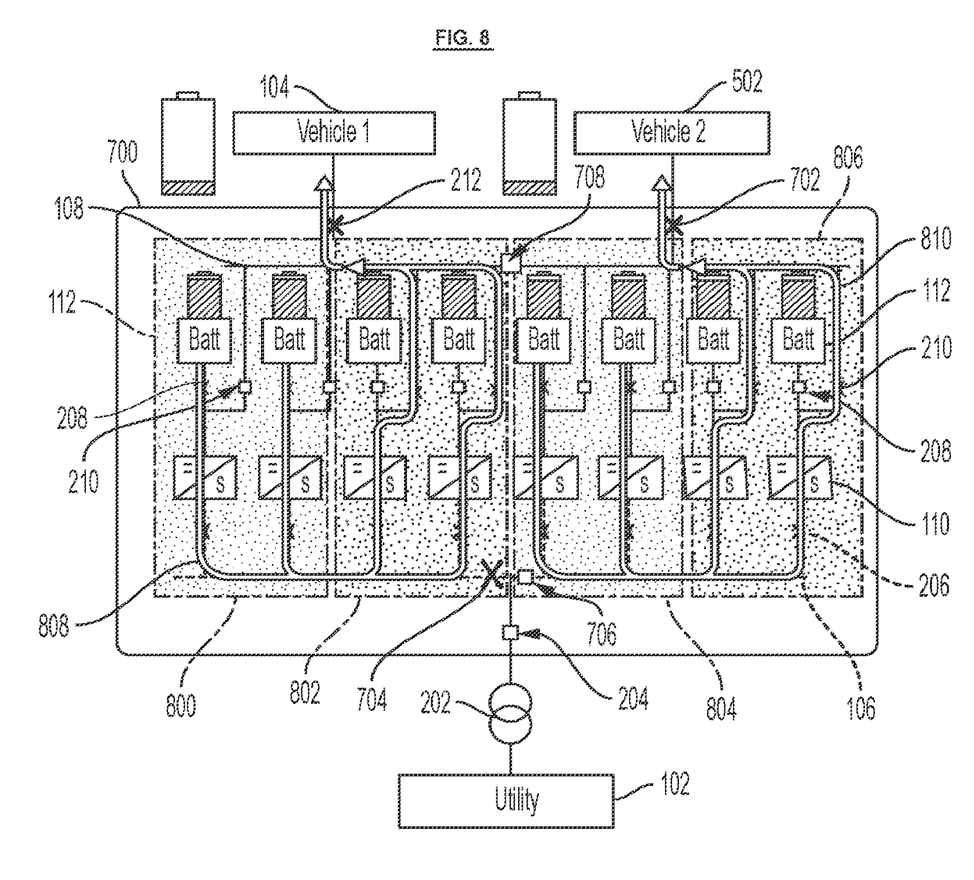
FIG. 8 shows the energy storage system of FIG. 7 in one configuration to charge multiple electric vehicles according to some embodiments.

FIG. 8 shows an example of how the ESS 700 of FIG. 7 operates according to some embodiments. The tie breakers 704, 706, and 708 split the ESS 700 into two groups of independent chargers. For example, the AC tie breaker 704 and the DC tie breaker 708 separate the left half of the ESS 700 shown in FIG. 8 into a discharging station 800 having one or more racks 214 and a charging station 802 having one or more racks 214. Similarly, the AC tie breaker 706 and the DC tie breaker 708 separate the right half of the ESS 700 into a discharging station 804 having one or more racks 214 and a charging station 806 having one or more racks 214. In the example shown, the AC tie breaker 706 and the DC tie breaker 708 are opened. The breakers 208 of the stations 800 and 804 are closed and the breakers 210 of these stations are open, whereas the breakers 208 of the stations 802 and 806 are open and the breakers 210 of these stations are closed. This configuration allows for the batteries 112 of the stations 800 and 804 to discharge and provide power to the EVs 104 and 502 through the stations 802 and 806, respectively, while the batteries 112 of the stations 802 and 806 are disconnected from the EVs 104 and 502. This configuration can also reduce the cost of electricity because the amount of kilowatt-hours (kWh) is reduced by charging multiple loads (e.g., cars or appliances) simultaneously.

Figure 9:
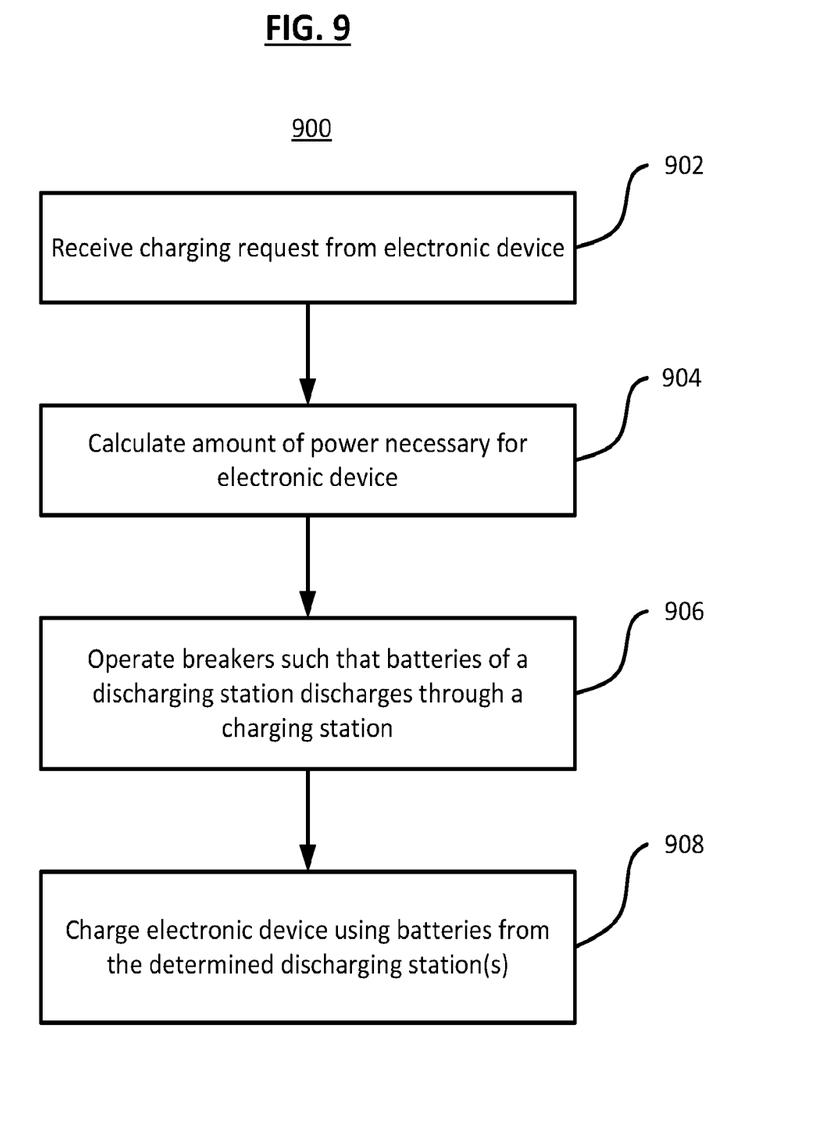
FIG. 9 is a flow chart of a method of operating an energy storage system according to some embodiments.

FIG. 9 shows a method 900 of operating an energy storage system (for example, ESS 200 or 700) according to some embodiments. The controller of the ESS receives a charging request from an electronic device; step 902. The electronic device may be an electric vehicle or any other electronic device such as computing device or appliance, etc., as explained below. The controller calculates the amount of power necessary for the electronic device; step 904. The controller may also calculate the amount of power that can be supplied by the ESS based on the SOC of the batteries in the ESS. If there is insufficient SOC in the batteries for the ESS, the controller may deny the request or have a utility power grid directly provide all the power for the electronic device.

The controller subsequently operates each of the breakers installed in the ESS such that the battery of one station (a discharging station) discharge through another station (a charging station); step 906. More than one station may be capable of discharging its battery to supply power. If a station is used for discharging (i.e., the battery of the station is used to power the electronic device), said station cannot be used as a pathway for another station. How each of the breakers affects the electrical flow is shown above with respect to FIGS. 3, 5, 6, and 8, although the embodiments are not limited to the examples in said figures. There may be any number of batteries (or racks) in each charging/discharging station. In some examples, the breakers may all be operated simultaneously and/or instantaneously. After the breakers are operated, the controller can then allow the ESS to charge the electronic device using the batteries from the determined station(s); step 908. As shown above, some of the batteries may be disconnected by opening the appropriate breakers such that the voltage level may be reduced.

Figure 10:
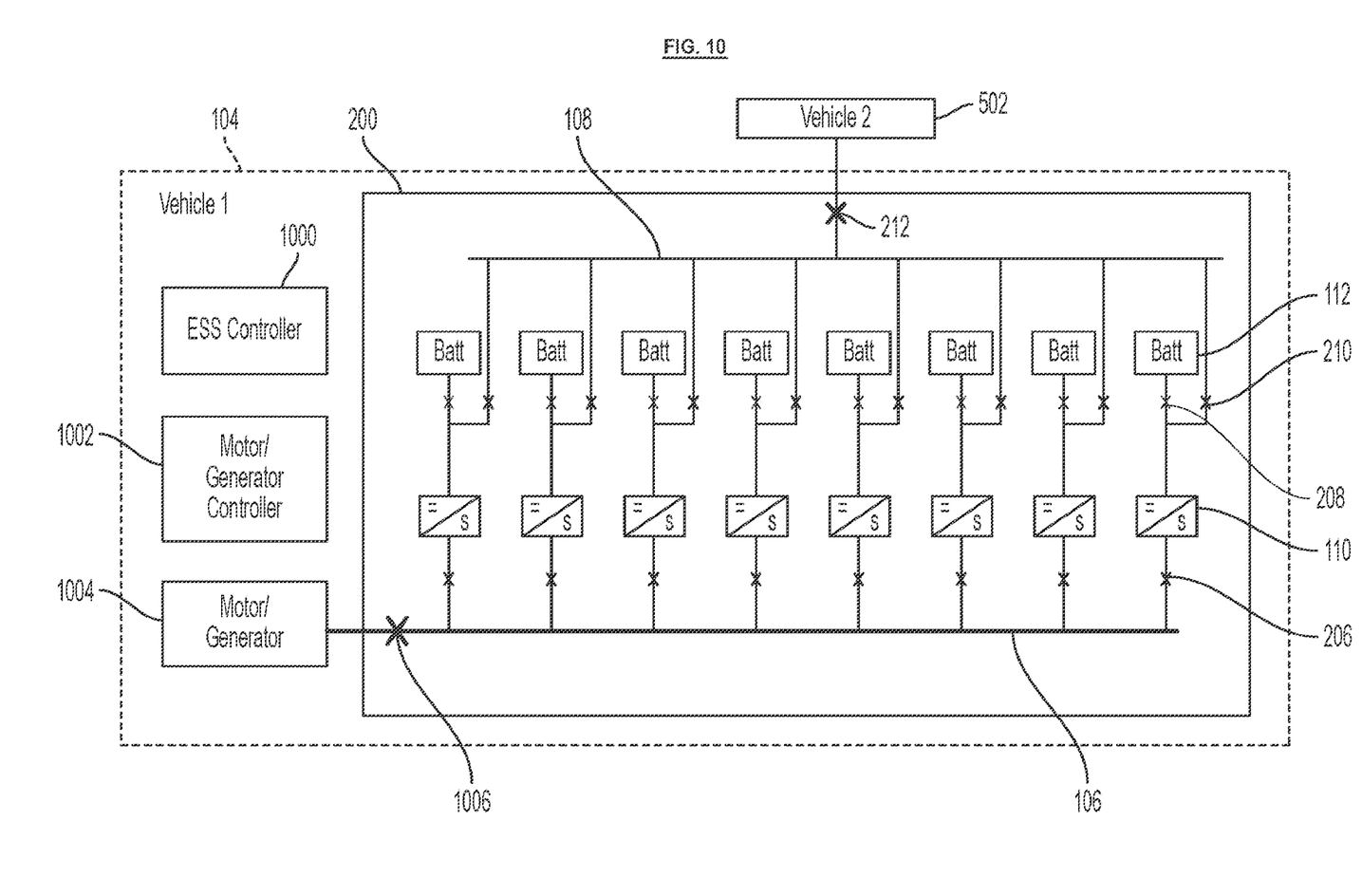
FIG. 10 is a schematic diagram of an example of an energy storage system as implemented in an electric vehicle according to some embodiments.

FIG. 10 shows an example of how the ESS 200 of FIG. 2 operates according to some embodiments, in which the ESS 200 is implemented in the EV 104. That is, instead of being a separate external component which connects with the EV 104, the ESS 200 is part of the energy storage device of the EV 104. For simplicity, the utility power grid 102, the transformer 202, and the utility breaker 204 are not shown. The EV 104 may include an ESS controller 1000 to control the breakers 206, 208, 210 that are directly coupled with the inverters 110 or batteries 112 as well as the DC load breaker 212 and an additional AC breaker 1006 of the AC bus 106.

The additional AC breaker 1006 controls the electrical connection between a motor/generator 1004 of the EV 104 and the AC bus 106. For example, the AC breaker 1006 disconnects the motor/generator 1004 from the ESS 200 when the EV 104 is being used as a charging station for the additional EV 502, in which the DC load breaker 212 allows the batteries 112 to be connected with the EV 502 in order to charge the batteries of the EV 502. The AC breaker 1006 may provide an additional layer of security so as to prevent the motor 1004 of the EV 104 from accidentally receiving power and activating when the ESS 200 is being used to provide power to another EV 502 or electronic device. Additionally, the EV 104 includes a motor/generator controller 1002 which controls the operation of the motor/generator 1004. In some examples, the ESS controller 1000 may determine whether to activate/deactivate the AC breaker 1006 based on the operation of the motor/generator controller 1002.

Although the examples are explained using EVs as the device which requires electrical power, it is understood that any other electronic device may be charged using the ESS as described above. For example, the electronic device may be a household appliance such as a refrigerator, electric oven, television, lamp, air conditioner, etc. when the ESS is used as a backup power source to be activated in case of a power outage or other emergencies. The electronic device may be a computing device such as a server, computer, smart device, etc. which may require higher or lower voltage level compared to the household appliances. Because of the different levels of voltage that are required for each type of electric devices, the ESS has the benefit of offering flexible and adjustable DC outputs without the need for a DC/DC converter as is previously required to accommodate a wide range of voltage levels. As explained above, a plurality of electronic devices may be charged simultaneously using the ESS. Some of the batteries of the ESS may also be charged using the utility power grid simultaneously as the rest of the other batteries of the ESS charge the electronic device(s). Any number of charging and discharging stations may be implemented as deemed suitable by the controller. In some embodiments, the reduction of DC/DC converters is advantageous in simplifying the design of the ESS for manufacture as well as reducing the size of the ESS, which may lead to reduced cost of manufacture. In some embodiments, the reduced size may be beneficial if the ESS is implemented in an electric vehicle, hybrid vehicle, and/or portable power generators in which the amount of space available is limited. The reduction of DC/DC converters may also be beneficial in reducing the risk of failure of such converters, which may be caused by degradation with use over time, for example. Furthermore, in some examples, the size of the inverters that are implemented may be adjusted such that the inverters have greater power rating (in kVA), as determined by multiplying the AC voltage by the AC current of the inverters. Faster charging is facilitated by increasing the inverters' power rating. With greater current flowing through the system, the size of the individual components of the ESS, such as the breakers, inverters, and/or cables, may be adjusted accordingly, as suitable for the application of the ESS.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for charging an electronic device using an energy storage system comprising a controller, the method comprising:
   calculating, by the controller, an amount of power necessary to charge the electronic device;
   operating, by the controller, a plurality of breakers in a discharging station of the energy storage system and a plurality of breakers in a charging station of the energy storage system, causing a first set of batteries in the discharging station to discharge through the charging station and bypassing a second set of batteries in the charging station; and
   charging the electronic device using the first set of batteries in the discharging station.

2. The method of claim 1, wherein the discharging station and the charging station each includes one or more racks, each rack including a battery, an inverter, a first breaker coupling the battery with the inverter, and a second breaker coupling the inverter with a DC bus of the energy storage system.

3. The method of claim 1, further comprising operating at least one of the plurality of breakers to be in an open position and reducing a number of batteries in the first set of batteries to be discharged in the discharging station.

4. The method of claim 1, the operating the plurality of breakers comprising:
   operating a first set of breakers in the plurality of breakers of the discharging station to electrically couple the first set of batteries of the discharging station with an AC bus of the energy storage system; and
   operating a second set of breakers in the plurality of breakers of the charging station to electrically couple plurality of inverters of the charging station with a DC bus of the energy storage system.

5. The method of claim 4, the operating the plurality of breakers further comprising:
operating a third set of breakers in the plurality of breakers of the discharging station to electrically disconnect the first set of batteries of the discharging station from the DC bus; and
operating a fourth set of breakers in the plurality of breakers of the charging station to electrically disconnect the second set of batteries of the charging station from the AC bus.

6. The method of claim 1, wherein the electronic device is an electric vehicle.

7. An energy storage system for charging an electronic device, the energy storage system comprising:
a discharging station comprising a first set of batteries, a plurality of breakers, and a first set of inverters,
a charging station comprising a second set of batteries, a plurality of breakers, and a second set of inverters, and
a controller operatively coupled with the first and second set of batteries and the plurality of breakers,
the controller configured to calculate an amount of power necessary to charge the electronic device, operate the plurality of breakers, causingthe first set of batteries in the discharging station to discharge through the charging station and bypassing the second set of batteries in the charging station, and charge the electronic device using the first set of batteries.

8. The energy storage system of claim 7, further comprising a DC bus,
the discharging station and the charging station each including one or more racks, each rack including: a battery, an inverter, a first breaker coupling the battery with the inverter, and a second breaker coupling the inverter with the DC bus.

9. The energy storage system of claim 7, the controller further configured to operate at least one of the plurality of breakers in the discharging station to be in an open position and reduce a number of batteries in the first set of batteries to be discharged in the discharging station.

10. The energy storage system of claim 7, further comprising a DC bus and an AC bus, the plurality of breakers including:
a first set of breakers in the plurality of breakers of the discharging station, the first set of breakers configured to electrically couple the first set of batteries of the discharging station with the AC bus; and
a second set of breakers in the plurality of breakers of the charging station, the second set of breakers configured to electrically couple the second set of inverters of the charging station with the DC bus,
wherein the controller is configured to operate the first and second sets of breakers to be in a closed-circuit configuration when the electronic device is being charged.

11. The energy storage system of claim 10, further including:
a third set of breakers in the plurality of breakers of the discharging station, the third set of breakers configured to electrically couple the first set of batteries of the discharging station with the DC bus; and
a fourth set of breakers in the plurality of breakers of the charging station, the fourth set of breakers configured to electrically couple the second set of batteries of the charging station with the AC bus,
wherein the controller is configured to operate the third and fourth sets of breakers to be in an open-circuit configuration when the electronic device is charged.

12. A controller of an energy storage system for charging an electronic device, the controller configured to:
calculate an amount of power necessary to charge the electronic device,
operate a plurality of breakers in a discharging station of the energy storage system and a plurality of breakers in a charging station of the energy storage system, causing a first set of batteries in the discharging station to discharge through the charging station and bypassing a second set of batteries in the charging station, and
charge the electronic device using the first set of batteries in the discharging station.

13. The controller of claim 12, the discharging station and the charging station each including one or more racks, each rack including: a battery, an inverter, a first breaker coupling the battery with the inverter, and a second breaker coupling the inverter with a DC bus of the energy storage system.

14. The controller of claim 12, further configured to operate at least one of the plurality of breakers to be in an open position and reduce a number of batteries in the first set of batteries to be discharged in the discharging station.

15. The controller of claim 12, wherein the plurality of breakers include:
a first set of breakers in the plurality of breakers of the discharging station, the first set of breakers configured to electrically couple the first set of batteries of the discharging station with an AC bus of the energy storage system; and
a second set of breakers in the plurality of breakers of the charging station, the second set of breakers configured to electrically couple a plurality of inverters of the charging station with a DC bus of the energy storage system,
wherein the controller is configured to operate the first and second sets of breakers to be in a closed-circuit configuration when the electronic device is being charged.

16. The controller of claim 15, wherein the plurality of breakers further include:
a third set of breakers in the plurality of breakers of the discharging station, the third set of breakers configured to electrically couple the first set of batteries of the discharging station with the DC bus; and
a fourth set of breakers in the plurality of breakers of the charging station, the fourth set of breakers configured to electrically couple the second set of batteries of the charging station with the AC bus,
wherein the controller is configured to operate the third and fourth sets of breakers to be in an open-circuit configuration when the electronic device is charged.

17. The method of claim 1, further comprising:
grouping, by the controller, a first set of racks from a plurality of racks of the energy storage system to be assigned to operate as the discharging station; and
grouping, by the controller, a second set of racks from the plurality of racks of the energy storage system to be assigned to operate as the charging station,
wherein each rack includes a battery, an inverter, a first breaker coupling the battery with the inverter, and a second breaker coupling the inverter with a DC bus of the energy storage system.

18. The method of claim 17, further comprising:
in response to the batteries in the first set of racks having low state of charge (SOC) incapable of supplying the amount of power necessary to charge the electronic device, regrouping, by the controller, the first set of racks to be reassigned to operate as the charging station and the second set of racks to be reassigned to operate as the discharging station; and causing the first set of batteries in the discharging station to discharge through the charging station and bypassing the second set of batteries in the charging station.

19. The method of claim 17, further comprising:

grouping, by the controller, a third set of racks from the plurality of racks of the energy storage system to be assigned to operate as a second discharging station comprising a third set of batteries;

grouping, by the controller, a fourth set of racks from the plurality of racks of the energy storage system to be assigned to operate as a second charging station comprising a fourth set of batteries;

causing the third set of batteries in the second discharging station to discharge through the second charging station and bypassing the fourth set of batteries in the second charging station; and charging a secondary electronic device using the third set of batteries in the second discharging station simultaneously as the charging of the electronic device using the first set of batteries in the discharging station.

20. The method of claim 1, further comprising:

in response to the first set of batteries in the discharging station having low state of charge (SOC), operating, by the controller, a utility breaker to electrically couple the energy storage system with a utility power grid; and simultaneously charging the first set of batteries and the electronic device with electricity received from the utility power grid.

* * * * *